(12) United States Patent
Yeh et al.

(10) Patent No.: US 10,343,924 B2
(45) Date of Patent: Jul. 9, 2019

(54) USING METHOD OF WASTE SILICON SLURRY AND PRODUCTS OBTAINED THEREFROM

(71) Applicant: GET GREEN ENERGY CORP., LTD., Taichung (TW)

(72) Inventors: Jiann-Yih Yeh, Changhua County (TW); Shin-Lee Liu, Pingtung County (TW); Po-Nien Lai, Taichung (TW); Min-Zih Wu, Kaohsiung (TW); Hsin Lo, Taichung (TW)

(73) Assignee: GET GREEN ENERGY CORP., LTD., Taichung (TW)

( * ) Notice: Subject to any disclaimer, the term of this patent is extended or adjusted under 35 U.S.C. 154(b) by 144 days.

(21) Appl. No.: 15/374,521

(22) Filed: Dec. 9, 2016

(65) Prior Publication Data

US 2017/0197842 A1    Jul. 13, 2017

(30) Foreign Application Priority Data

Jan. 12, 2016   (TW) .............................. 105100782 A

(51) Int. Cl.
*C01B 33/32* (2006.01)
*C01B 3/06* (2006.01)
*C01G 49/00* (2006.01)
*C02F 1/68* (2006.01)
*C21B 15/00* (2006.01)
(Continued)

(52) U.S. Cl.
CPC ............ *C01B 33/32* (2013.01); *C01B 3/06* (2013.01); *C01G 49/00* (2013.01); *C02F 1/5236* (2013.01); *C02F 1/68* (2013.01); *C02F 1/682* (2013.01); *C02F 1/72* (2013.01); *C21B 15/00* (2013.01); *C22B 3/065* (2013.01); *C22B 3/08* (2013.01); *C22B 3/165* (2013.01); *C22B 7/00* (2013.01); *C02F 1/001* (2013.01); *C02F 1/385* (2013.01); *C02F 1/60* (2013.01); *C02F 2101/20* (2013.01); *C02F 2101/32* (2013.01); *C02F 2103/12* (2013.01); *C02F 2103/34* (2013.01);
(Continued)

(58) Field of Classification Search
None
See application file for complete search history.

(56) References Cited

U.S. PATENT DOCUMENTS 6,299,780 B1 * 10/2001 Freshour ............ B01D 17/0214
                                                        210/708
2015/0086449 A1 * 3/2015 Sugita ...................... B09B 3/00
                                                        423/21.1

FOREIGN PATENT DOCUMENTS

CN         102659112        9/2012
CN         101691216 B      7/2013
(Continued)

OTHER PUBLICATIONS

KR100716064 Google translation; Sep. 29, 2018.*

*Primary Examiner* — Guinever S Gregorio
(74) *Attorney, Agent, or Firm* — Liu & Liu

(57) ABSTRACT

The present invention discloses a method of using a waste silicon slurry. The method includes the steps of: (A) obtaining a waste silicon slurry containing a cutting oil and a metal; (B) treating the waste silicon slurry with a first reagent for reacting with the cutting oil; (C) treating the waste silicon slurry with a second reagent for reacting with the metal; (D) separating products resulting from step (B) and step (C) to obtain a solid portion; and (E) treating the solid portion with a third reagent to obtain products, including silicates and hydrogen gas.

6 Claims, 5 Drawing Sheets

(51) Int. Cl.
    *C22B 3/06*           (2006.01)
    *C22B 3/08*           (2006.01)
    *C22B 3/16*           (2006.01)
    *C22B 7/00*           (2006.01)
    *C02F 1/52*           (2006.01)
    *C02F 1/72*           (2006.01)
    *C02F 1/38*           (2006.01)
    *C02F 103/34*       (2006.01)
    *C02F 1/00*           (2006.01)
    *C02F 1/60*           (2006.01)
    *C02F 101/20*       (2006.01)
    *C02F 101/32*       (2006.01)
    *C02F 103/12*       (2006.01)

(52) U.S. Cl.
    CPC ........... *C02F 2209/02* (2013.01); *Y02E 60/36* (2013.01); *Y02P 10/212* (2015.11)

(56) References Cited

FOREIGN PATENT DOCUMENTS

| | | | |
|---|---|---|---|
| JP | 2006231245 A | * | 9/2006 |
| JP | 2008290897 A | * | 12/2008 |
| TW | M469311 U | | 1/2014 |
| TW | 201446316 A | | 12/2014 |

* cited by examiner

USING METHOD OF WASTE SILICON SLURRY AND PRODUCTS OBTAINED THEREFROM

BACKGROUND OF THE INVENTION

Field of the Invention

The present invention relates to a method of using a waste silicon slurry and, more particularly, to a method of reusing a waste silicon slurry to produce various products.

Description of the Prior Art

A waste silicon slurry is produced as a result of heavy use of silicon chips in electronic industry. The industrial sector put forth plenty of methods of recycling and treating the waste silicon slurry. For instance, TW96112970 discloses a method of high-temperature separation (heating up to a temperature between the melting points of silicon and silicon carbide, that is, between 1420° C. and 1500° C.) to recycle silicon from the waste silicon slurry. TW99118261 and TW99118266 disclose a method of recycling silicon carbide and silicon from a waste silicon slurry, which involving putting the waste silicon slurry in a pyrolysis furnace to distill and heat the waste silicon slurry therein at above 250° C. TW99133041 discloses a method of recycling a cutting liquid from the waste silicon slurry and teaches keeping the waste silicon slurry in a container deprived of oxygen until the cutting liquid vaporizes. The aforesaid method disadvantageously requires a high temperature and consumes much energy. TW98115605 discloses recycling silicon from a waste silicon slurry by particle phase-transfer but necessitates multiple instances of idling, centrifugal separation, and drying. TW95150091 discloses rinsing a silicon slurry with acetone, allowing the rinsed silicon slurry to undergo centrifugal separation and drying to remove the silicon and silicon carbide from the silicon slurry, and introducing a flotation agent to separate the silicon and silicon carbide. Both the aforesaid two methods are time-consuming. Although the industrial sector put forth plenty of methods of recycling and treating the waste silicon slurry, the methods are defective and thus still have room for improvement.

SUMMARY OF THE INVENTION

The present invention relates to a method of using a waste silicon slurry and, more particularly, to a method of treating a waste silicon slurry which contains a cutting oil and a metal. The present invention involves using newly developed reagents to pretreat the waste silicon slurry such that its cutting oil and metal become dissolved in an aqueous solution or an oily layer. Then, an appropriate solid-liquid separation process is performed to obtain the waste silicon slurry pasty. Afterward, the waste silicon slurry pasty is treated with a reagent which reacts with silicon to produce an aqueous silicate solution, so as to produce silicates and hydrogen gas. The present invention has at least one of the following features.

The method of the present invention removes a cutting oil, metal, and silicon from the waste silicon slurry to recycle products which do not contain the aforesaid constituents substantially or products which the aforesaid constituents are mostly removed from. The method of the present invention enables the recycled products to be reused in the other industries, such as the polisher industry and the cosmetic industry. Hence, with the method of the present invention, the waste silicon slurry is treated to achieve an environment-friendly treatment process which does not produce any solid wastes substantially.

As for the waste silicon slurry which contains silicon carbide, the method of the present invention is effective in separating silicon carbide and silicon and thus obtaining highly pure silicon carbide products.

The method of the present invention is performed without causing clogging.

The method of the present invention avoid any process which must be performed at a temperature above 140° C. Hence, the present invention surpasses the prior art in energy saving. The method of the present invention at least includes the following aspects.

A method of using a waste silicon slurry, comprising the steps of:

step (A): obtaining a waste silicon slurry containing a cutting oil and a metal; step (B): treating the waste silicon slurry with a first reagent for reacting with the cutting oil; step (C): treating the waste silicon slurry with a second reagent for reacting with the metal; step (D): separating products resulting from step (B) and step (C) to obtain a solid portion; and step (E): treating the solid portion with a third reagent to obtain silicates and hydrogen gas.

Regarding the method of using a waste silicon slurry, the cutting oil includes a mineral oil and contains a component having chemical group selected from sulfonate, amine salt, hydroxyl, carboxyl-containing acid group, amino, or having element selected from nitrogen, sulfur, chlorine, phosphorus, and a combination thereof. The first reagent includes one, or any combinations, of compounds with structural formula (I): M-X, wherein M is selected from an alkaline metal and an alkaline earth metal, and X is selected from halogen, sulfate and nitrate, or M is selected from $C_5$-$C_{12}$ alkyl groups, and X is selected from hydrogen and hydroxyl.

Regarding the method of using the waste silicon slurry, each compound of the structural formula (I) is selected from sodium chloride, potassium chloride, calcium chloride, sodium sulfate, sodium nitrate, ethanol, n-hexane, and a combination thereof.

Regarding the method of using the waste silicon slurry, the metal contains iron, and the second reagent contains one, or any combinations, of an inorganic acid and an organic acid.

Regarding the method of using the waste silicon slurry, the second reagent is selected from oxalic acid, citric acid and acetic acid.

Regarding the method of using the waste silicon slurry, the first reagent is an aqueous sodium chloride solution, and the second reagent includes oxalic acid and citric acid.

Regarding the method of using the waste silicon slurry, the step (C) entails determining the type of the second reagent in use according to the type of the first reagent in use.

Regarding the method of using the waste silicon slurry, when the first reagent includes one, or any combinations, of compounds which conform with structural formula (I), wherein M is selected from $C_5$-$C_{12}$ alkyl groups, and X is selected from hydrogen and hydroxyl, the second reagent is selected from oxalic acid, citric acid, and acetic acid.

An aqueous silicate solution is produced by any one of the aforesaid methods.

A silicon carbide-containing powder is produced by any one of the aforesaid methods, wherein the waste silicon slurry contains silicon carbide.

The present invention still includes the other aspects and various embodiments for solving the other problems. The aforesaid aspects are hereunder disclosed in detail and illustrated by embodiments.

DETAILED DESCRIPTION OF THE EMBODIMENTS

Figure 1:
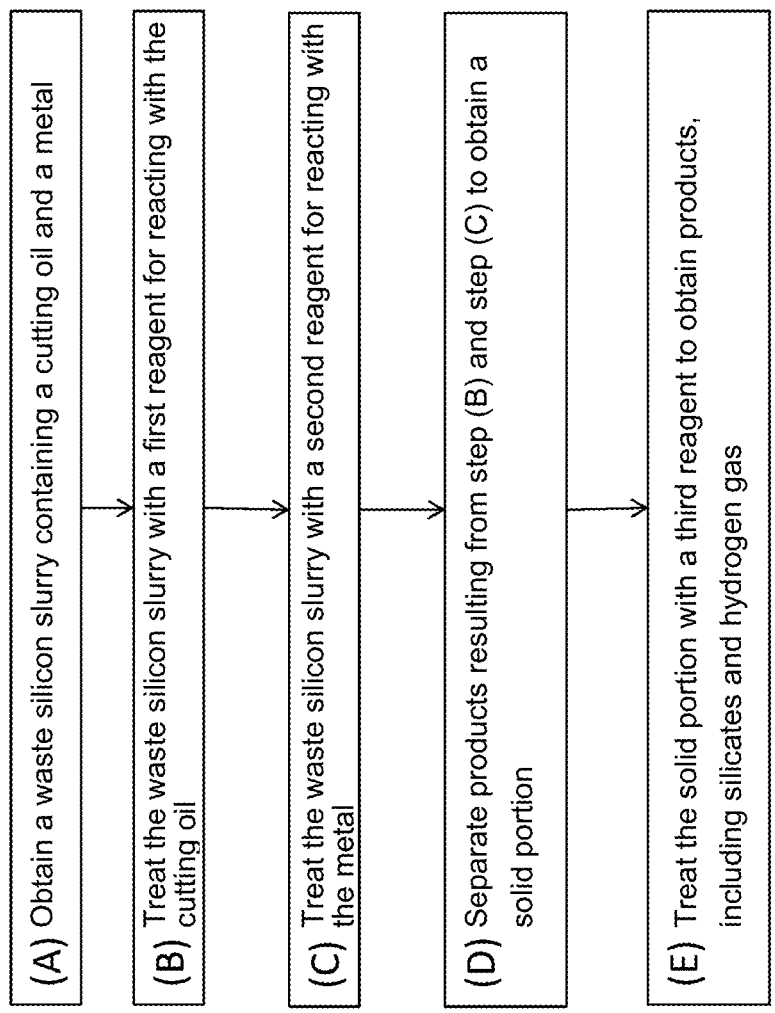
FIG. 1 is a flow chart of a method of using a waste silicon slurry according to the present invention.

The preferred embodiments of the present invention are hereunder illustrated with the accompanying drawings. Similar components shown in the accompanying drawings are denoted with identical reference numerals. To present the present invention clearly and avoid focusing on non-essential technical features of the present invention, the accompanying drawings are not drawn to scales. Conventional parts and components, related materials, and related treatment techniques are omitted from the description below.

Referring to FIG. 1, the present invention provides a method of using a waste silicon slurry, comprising the steps of: (A) obtaining a waste silicon slurry containing a cutting oil and a metal; (B) treating the waste silicon slurry with a first reagent for reacting with the cutting oil; (C) treating the waste silicon slurry with a second reagent for reacting with the metal; (D) separating products resulting from step (B) and step (C) to obtain a solid portion; and (E) treating the solid portion with a third reagent to obtain products, including silicates and hydrogen gas. The purpose of step (B) and step (C) is to pretreat the waste silicon slurry, eliminate the conglomeration of the waste silicon slurry in water, so that its constituents can be separated and uniformly dispersed in an aqueous solution or an oily layer, allowing the cutting oil, metal or the other constituents to be dissolved in the aqueous solution or the oily layer as much as possible. It is necessary to determine whether to execute one, or both, of step (B) and step (C) according to the constituents of the waste silicon slurry obtained. Upon determination that both step (B) and step (C) are to be executed, it is feasible to execute step (B) and step (C) simultaneously or in any order, preferably executing step (B) and then step (C). The purpose of step (D) is to effectuate solid-liquid separation of the pretreated waste silicon slurry. The purpose of step (E) is to remove silicon element from the solid portion. The steps are described in detail below.

Step (A): Obtaining a Waste Silicon Slurry Containing a Cutting Oil and a Metal.

The waste silicon slurry for use in the present invention originates from residues produced in a process of cutting a silicon ingot into silicon wafers. Hence, constituents of the waste silicon slurry include broken pieces of a silicon wafer, cutting oil, and traces of metal resulting from a metal cutting wire, such as copper, iron, tungsten, zinc, and aluminum. If a diamond cutting wire is in use, no metal is likely to be produced, but traces of broken pieces of diamond (adamas) are likely to be produced. The waste silicon slurry can also contain aluminum oxide, silicon carbide, adamas, cerium oxide and silicon dioxide which serve as a polisher for use in the cutting process. The cutting oil is basically a mineral oil which is a mixture of carbohydrates, for example, an oily mixture of paraffin base, cyclic alkyl group and aromatic groups, wherein the cutting oil in wide use is characterized in that the paraffin base to aryl ratio is larger than 1. The cutting oil is capable of lubrication. During the cutting process, a cutting region of the silicon ingot generates different amounts of heat and different levels of pressure. Low-viscosity oil is thin and thus good at infiltration and wetting to therefore spread to the whole cutting region quickly. Since it is thin, the oil displays excellent capability of cooling and rinsing. High-viscosity oil is thick and thus good at lubrication and metal surface insulation, but is outperformed by low-viscosity oil in fluidity and cooling. In addition to a mineral oil, the cutting oil contains an emulsifier, an antirusting additive, an extreme-pressure additive, or any other aids, and contains one of sulfonate, amine salt, hydroxyl, carboxyl-containing acid group, amino, element nitrogen, element sulfur, element chlorine, element phosphorus, and a combination thereof.

Step (B): Treating the Waste Silicon Slurry with a First Reagent for Reacting with the Cutting Oil.

The two purposes of the first reagent of the present invention are: preclude the conglomeration of the waste silicon slurry in water, and treat the cutting oil so that it can dissolve in an aqueous solution or an oily layer. The first reagent includes water and one, or any combinations, of compounds which conform with structural formula (I), with structural formula (I): M-X, wherein M is selected from an alkaline metal and an alkaline earth metal, and X is selected from halogen, sulfate and nitrate, or M is selected from $C_5$-$C_{12}$ alkyl groups, and X is selected from hydrogen and hydroxyl. The first reagent whose M is selected from an alkaline metal and an alkaline earth metal is inorganic, preferably adapted for use in treating a cutting oil which contains sulfonate and amine salts. The first reagent whose M is selected from alkyl groups is organic, preferably adapted for use in treating a cutting oil which contains one of hydroxyl, carboxyl-containing acid group, amino, element nitrogen, element sulfur, element chlorine, element phosphorus, and a combination thereof, especially for use in treating a cutting oil which contains an extreme-pressure additive. The extreme-pressure additive comprises vulcanized fatty acid ester, chlorinated alkane, phosphate ester, and/or nitrogen-containing compound.

The inorganic compound expressed by structural formula (I) is water-soluble and has a solubility of at least 1 wt % at 1 atm and 25° C., and is preferably sodium chloride, potassium chloride, calcium chloride, sodium sulfate, or sodium nitrate. The organic compound expressed by structural formula (I) is water-soluble (such as an alcohol) or water-insoluble to form an oily layer (such as an alkane), wherein the alkane is exemplified by n-hexane which is suitable for use in the situation where the cutting oil contains an oil-soluble extreme-pressure additive, such as chlorinated paraffin. Step (B) is preferably executed in a manner described below. One of more compounds of structural formula (I) are prepared in the form of an aqueous solution with a total weight percentage of 10% or lower to produce the first reagent, wherein the aqueous solution contains an appropriate amount of organic compounds of structural formula (I). Then, an appropriate amount of the first reagent is introduced into a container which contains the waste silicon slurry to achieve a ratio of first reagent to waste silicon slurry in weight, which ranges from 1:2 to 10:1. While stirring is optional, the temperature of the waste silicon slurry, which the first reagent was introduced into, is increased to a temperature higher than room temperature, preferably 50° C., but not higher than 60° C. Depending on whether stirring is carried out, the treatment temperature, and intrinsic features of the waste silicon slurry, it takes 30 minutes to several hours treating 100 kg of waste silicon slurry. Step (B) must be stopped if the following criterion is met: take an appropriate sample from the waste silicon slurry which the first reagent was introduce into; measure and determine whether the sample contains any particle of at least 100 μm (preferably 1 μm) in diameter; and stop performing step (B) upon determination that no particle of at least 100 μm (preferably 1 μm) in diameter is present in the sample. Step (B) is dispensed with, in a variant embodiment of the present invention, when the waste silicon slurry has low cutting oil content or does not contain any significant amount of cutting oil.

Step (C): Treating the Waste Silicon Slurry with a Second Reagent for Reacting with the Metal.

The purpose of the second reagent of the present invention is: treat a metal in the waste silicon slurry such that it can dissolve in an aqueous solution. The second reagent of the present invention contains water and one, or any combinations, of an inorganic acid and an organic acid.

The inorganic acid or organic acid of the present invention is water-soluble and has a solubility of at least 1 wt % at 1 atm and 25° C. It is preferably exemplified by sulfuric acid, nitric acid, oxalic acid, citric acid, or acetic acid, and most preferably citric acid, acetic acid, or oxalic acid. Preferably, step (C) is executed in a manner described below. One or more inorganic acid compounds or organic acid compounds are prepared in the form of an aqueous solution with a total weight percentage of 10% or lower to produce the second reagent. Then, an appropriate amount of the second reagent is introduced into a container which contains the waste silicon slurry to achieve a ratio of second reagent to waste silicon slurry in weight, which ranges from 1:2 to 10:1. While stirring is optional, the temperature of the waste silicon slurry, which the second reagent was introduced into, is increased to room temperature, preferably 30° C., but not higher than 60° C. Depending on whether stirring is carried out, the treatment temperature, and intrinsic features of the waste silicon slurry, it takes 30 minutes to several hours treating 100 kg of waste silicon slurry. Step (C) must be stopped if the following criterion is met: take an appropriate sample from the waste silicon slurry, which the second reagent was introduced into; remove water from the sample, and measure its metal content; if the measured metal content is less than or equal to 150 ppm, step (C) must be stopped. Step (C) is dispensed with, in a variant embodiment of the present invention, when the waste silicon slurry has low metal content or does not contain any significant amount of metal. In the situation where both the first reagent in step (B) and the second reagent in step (C) are introduced, it is preferred to execute step (B) and then step (C), and most preferably determine the type of the second reagent in use according to the type of the first reagent in use. By determining the type of the second reagent in use according to the type of the first reagent in use, the method of the present invention advantageously prevents any conflict between the first reagent and the second reagent, as the conflict usually compromises the efficiency of pretreatment. For instance, in the situation where the waste silicon slurry is treated with the organic first reagent (such as n-hexane), it is feasible to avoid using the inorganic second reagent, and thus a preferred pretreatment effect can be achieved. The organic first reagent is often used to treat the waste silicon slurry with high extreme-pressure additive content. The second reagent, such as an inorganic acid (nitric acid and sulfuric acid) is highly susceptible to oxidation and thus is likely to react with organic constituents (such as vulcanized fatty acid ester or ethanolamine which functions as an extreme-pressure additive) in a solution or react with the organic first reagent to bring about precipitated impurities.

Step (D): Separating Products Resulting from Step (B) and Step (C) to Obtain a Solid Portion.

The purpose of step (D) is to effectuate solid-liquid separation of the waste silicon slurry which has undergone the aforesaid pretreatment to obtain a solid portion (also known as a waste silicon slurry pasty). Step (D) is performed by any appropriate conventional means, such as any appropriate filtration or centrifugal separation apparatuses, including a conventional pressure filter, filter bell, or centrifuge.

Step (E): Treating the Solid Portion with a Third Reagent to Obtain Products, Including Silicates and Hydrogen Gas.

The purpose of step (E) is to use the third reagent to remove silicon from the waste silicon slurry pasty. The third reagent of the present invention contains water and one, or any combinations, of silicates which can react with silicon. The silicates which can react with silicon include alkaline substance which produce hydroxyl ions in water, such as a caustic base of alkaline metal LiOH, NaOH, KOH and a caustic base of alkaline earth metal $Ca(OH)_2$. The third reagent is typical exemplified by a sodium hydroxide aqueous solution. Preferably, step (E) is executed in a manner described below. A compound (such as sodium hydroxide) which can react with silicon to produce silicates is prepared in the form of an aqueous solution with a total weight percentage of 50% or lower to produce the third reagent. Then, an appropriate amount of the third reagent is introduced into a container (for example, closed container or open container) which contains the waste silicon slurry to achieve a ratio of third reagent to waste silicon slurry in weight, which ranges from 0.4 to 6. While stirring is optional, the temperature of the waste silicon slurry, which the third reagent was introduced into, is increased to a temperature higher than room temperature, preferably 40° C., but not higher than 140° C. The container which contains the waste silicon slurry pasty is pressurized to a pressure of 1-20 $kg/cm^2$. Depending on whether stirring is carried out, the treatment temperature, and intrinsic features of the waste silicon slurry, it takes 30 minutes to several hours treating 100 kg of waste silicon slurry. During the reaction, a high-pressure storage bucket collects the hydrogen gas produced by the reaction. With a separation-purification apparatus, an aqueous silicate solution is obtained, and the waste silicon slurry pasty residues which do not contain silicon or silicon wafer substantially are recycled. The constituents of the waste silicon slurry pasty residues depend on the constituents of the initial waste silicon slurry. Untreated waste silicon slurry usually contains silicon carbide. After undergoing the aforesaid treatment by the method of the present invention, waste silicon slurry pasty residues are highly pure silicon carbide powder.

Figure 2:
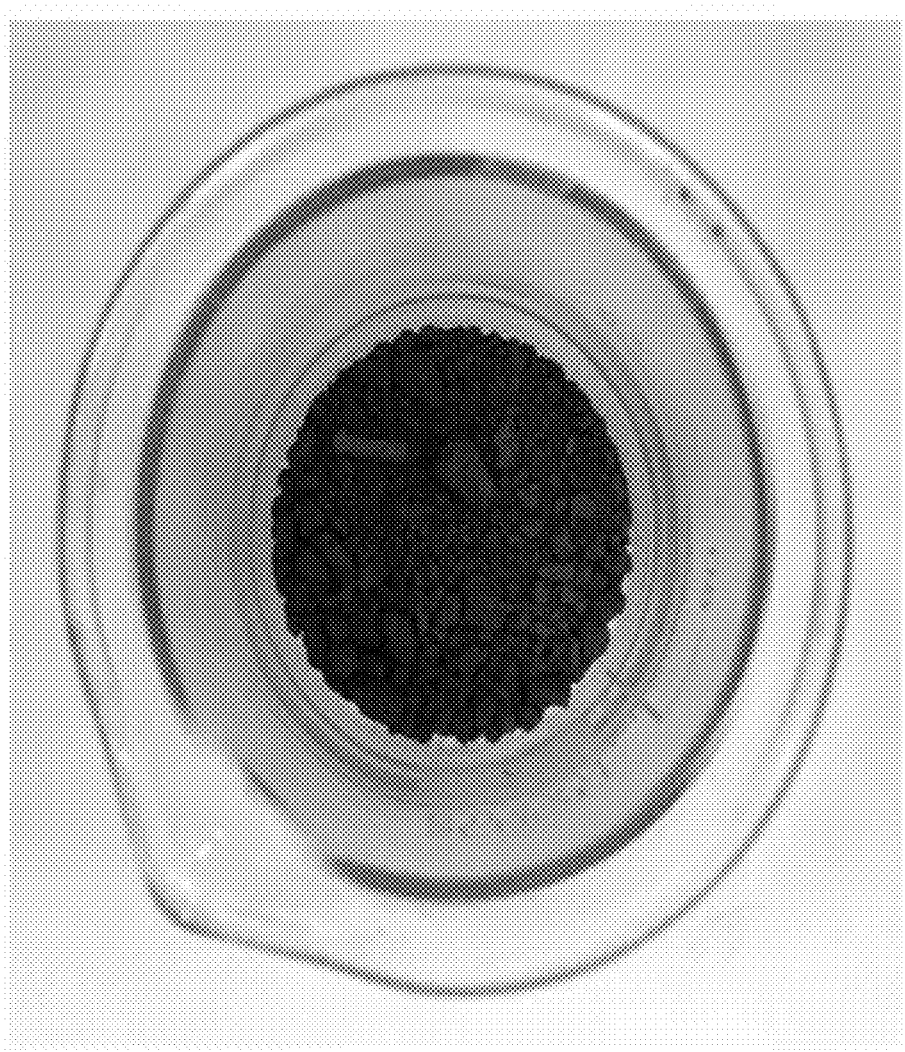
FIG. 2 shows a picture taken of the waste silicon slurry in use according to the present invention.

Embodiment 1: put 10 g of waste silicon slurry which contains a cutting oil and metal in a container, as shown in the picture of FIG. 2. Make sure that the waste silicon slurry comprises the following constituents with the specified proportions: 45.16 wt % of liquid content and 54.84 wt % of solid content. The solid content includes 36.3 wt % of silicon carbide, 57.3 wt % of iron, silicon and silicon dioxide, and 6.4 wt % of other impurities. The contents of related silicon carbide, silicon and silicon dioxide are measured by X-Ray diffractometer (XRD). The constituents of the waste silicon slurry can be assessed by any other techniques, for example, taking an appropriate amount (in grams) to measure water content ratio by Karl Fischer moisture titrator, and determine the constituent water content to be 30~33% by a reaction between NaOH and the waste silicon slurry in conjunction with Raman spectral analysis, silicon content of 40~45%, and silicon carbide content of 22~28%. The first reagent is provided: sodium chloride (NaCl) solution with a concentration of 0.4 wt % (adding 0.2 g of solute into 50 g of water.) Add around 50 g of the sodium chloride solution into 10 g of waste silicon slurry, heat the mixture to 50° C., and stir the mixture for 3 hours.

Comparative Example 1

Referring to the steps of Example 1, but comparative Example 1 is distinguished from Example 1 in that, in comparative Example 1, the first reagent is replaced by around 50 g of water.

Examples 2-9

Referring to the steps of Example 1, but Examples 2-9 are distinguished from Example 1 in that, in Examples 2-9, the first reagent is replaced by the following constituents: a potassium chloride solution of the same concentration in Example 2, a calcium chloride solution of the same concentration in Example 3, a sodium sulfate solution of the same concentration in Example 4, a sodium nitrate solution of the same concentration in Example 5, 10 ml of ethanol solution (95% industrial-grade ethanol) in Example 6, a solution mixture of sodium chloride (solute 50%) and potassium chloride (solute 50%) of the same concentration in Example 7, a solution mixture of sodium chloride and ethanol in Example 8 (adding 3 ml of 95% industrial-grade ethanol to 50.2 g of aqueous sodium chloride solution of Example 1), and a solution mixture of sodium chloride and n-hexane solution (adding 3 ml of n-hexane to 50.2 g of aqueous sodium chloride solution of Example 1) in Example 9.

Unlike comparative Example 1, Examples 1-9 are characterized in that: given the treatment performed with the first reagent, the waste silicon slurry is uniformly stirred to disperse significantly. By contrast, in comparative Example 1, even after the stirring has been performed for 3 hours, significant conglomerates are present, and the conglomerates neither meet related standards nor disperse even when stirred.

Example 10

Figure 3:
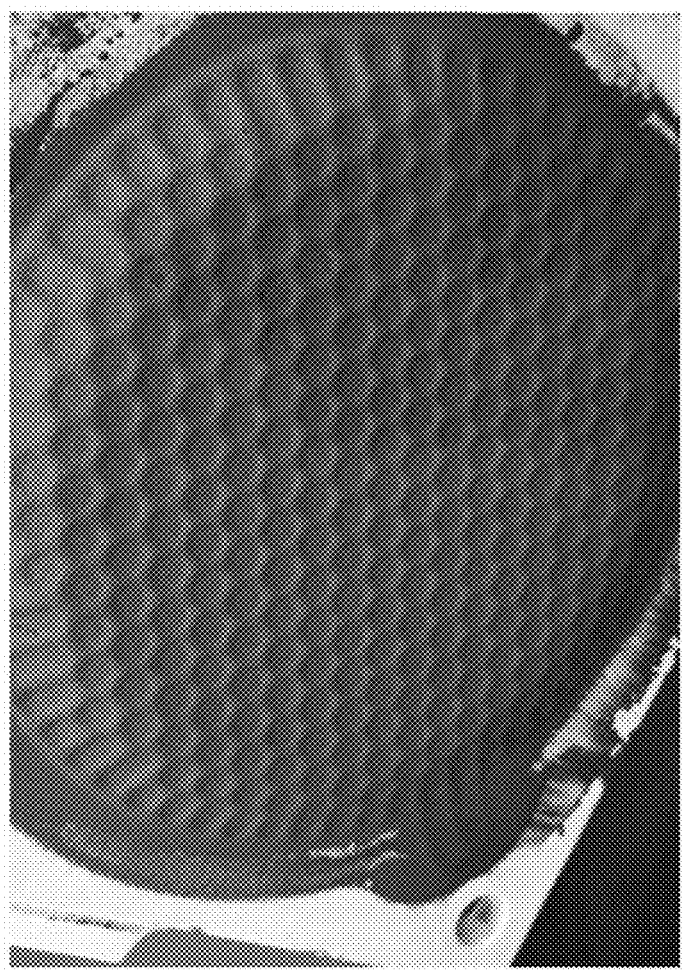
FIG. 3 shows a picture taken of a waste silicon slurry pasty produced according to the present invention.
Figure 4:
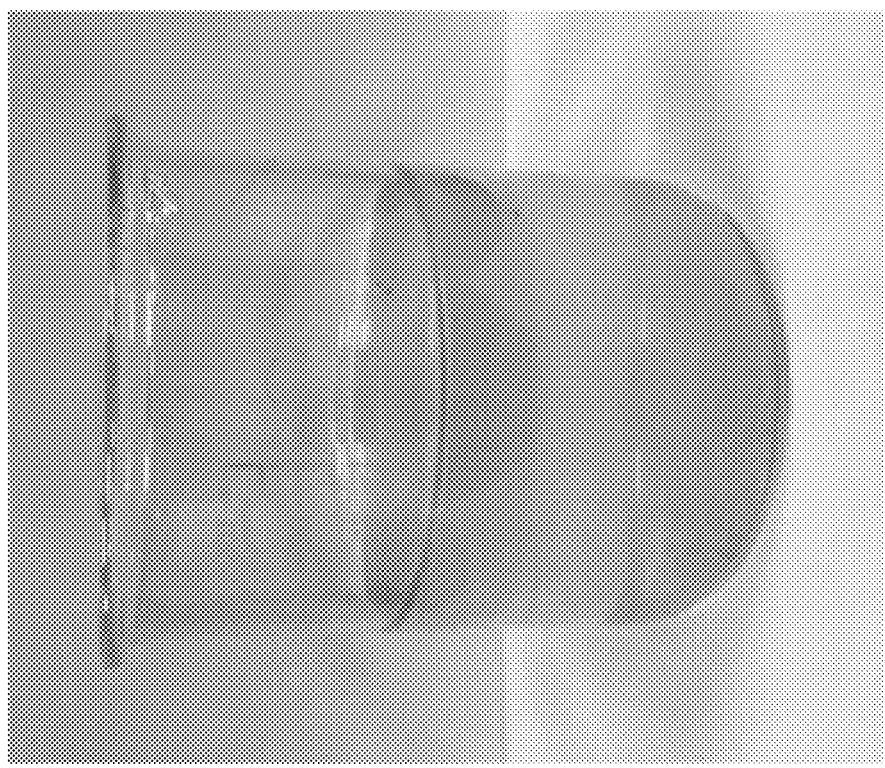
FIG. 4 shows a picture taken of an aqueous sodium silicate solution produced according to the present invention.
Figure 5:
FIG. 5 shows a picture taken of a recycled residue of waste silicon slurry pasty according to the present invention, and the residue does not contain silicon substantially.

Prepare the second reagent: an oxalic acid solution of 0.4 wt % (0.2 g of sodium oxalic acid is added to 50 g of water.) Add around 50 g of the second reagent to the waste silicon slurry product which sodium chloride was introduced into in Example 1. Heat the waste silicon slurry product to 50° C., stir it for 3 hours, allow the resultant product to undergo centrifugal separation, remove the supernatant (taking a sample to measure metal concentration), and take a solid portion like the waste silicon slurry pasty shown in the picture of FIG. 3. Prepare the third reagent: a sodium hydroxide solution of 4 wt %. Add 100 g of the third reagent to 10 g of the waste silicon slurry pasty. Allow the third reagent to react with the waste silicon slurry pasty at a pressure of 10 kg/cm² and a temperature of 80° C. for 3 hours to produce sodium silicate and hydrogen gas. With a separation-purification apparatus, a sodium silicate solution (shown in the picture of FIG. 4) is obtained, and the waste silicon slurry pasty residues which do not contain silicon or silicon wafer substantially are recycled. As shown in the picture of FIG. 5, the recycled waste silicon slurry pasty residues appear in the form of a powder whose silicon carbide content is higher than the silicon carbide content in the initial waste silicon slurry.

Examples 11-13

Referring to the steps of Example 10, but Examples 11-13 are distinguished from Example 10 in that, in Examples 11-13, the second reagent is replaced by constituents of the same concentration as follows: citric acid solution in Example 11, acetic acid solution in Example 12, and a solution mixture of oxalic acid and citric acid (with an oxalic acid to citric acid ratio of 1:50) in Example 13.

Comparative Example 2

This Example dispenses with the second reagent. Allow the product which the first reagent was introduced into in comparative Example 1 to undergo centrifugal separation directly, remove the supernatant (taking a sample to measure metal concentration), and take out the waste silicon slurry pasty. Prepare the third reagent: a sodium hydroxide solution of 4 wt %. Add 100 g of the third reagent to 10 g of the waste silicon slurry pasty. Allow the third reagent to react with the waste silicon slurry pasty at a pressure of 10 kg/cm² and a temperature of 80° C. for 3 hours to produce sodium silicate and hydrogen gas. With a separation-purification apparatus, an aqueous sodium silicate solution is obtained, and the waste silicon slurry pasty residues which do not contain silicon or silicon wafer substantially are recycled.

Examples 14 and 15

Referring to the steps of Example 10, but Examples 14 and 15 are distinguished from Example 10 in that, in Examples 14 and 15, the second reagent is replaced by constituents of the same concentration as follows: sulfuric acid solution in Example 14, and nitric acid solution in Example 15.

Example 16

Prepare the second reagent: a citric acid solution of 0.8 wt % (0.4 g of citric acid is added to 50 g of water.) Add around 50 g of the second reagent to the waste silicon slurry product which sodium chloride and n-hexane were introduced into in Example 9. Heat the waste silicon slurry product to 50° C., stir it for 3 hours, allow the resultant product to undergo centrifugal separation, remove the supernatant (taking a sample to measure metal concentration), and take out the solid portion. Prepare the third reagent: a sodium hydroxide solution of 4 wt %. Add 100 g of the third reagent to 10 g of the waste silicon slurry pasty. Allow the third reagent to react with the waste silicon slurry pasty at a pressure of 10 kg/cm² and a temperature of 80° C. for 3 hours to produce sodium silicate and hydrogen gas. With a separation-purification apparatus, an aqueous sodium silicate solution is obtained, and the waste silicon slurry pasty residues which do not contain silicon or silicon wafer substantially are recycled. The recycled waste silicon slurry pasty residues appear in the form of a powder whose silicon carbide content is higher than the silicon carbide content in the initial waste silicon slurry.

Table 1 shows the iron content in a liquid mixture treated with the three reagents in Examples 10-16 and comparative Example 2.

| Example | first reagent | second reagent | iron content in liquid mixture (ppm) |
| --- | --- | --- | --- |
| comparative Ex. 2 | sodium chloride 0.4 wt % | nil | 727 |
| Ex. 10 | sodium chloride 0.4 wt % | oxalic acid 0.4 wt % | 105.2 |
| Ex. 11 | sodium chloride 0.4 wt % | citric acid 0.4 wt % | 63.6 |
| Ex. 12 | sodium chloride 0.4 wt % | acetic acid 0.4 wt % | 89.5 |
| Ex. 13 | sodium chloride 0.4 wt % | oxalic acid plus citric acid 0.4 wt % | 19.3 |
| Ex. 14 | sodium chloride 0.4 wt % | sulfuric acid 0.4 wt % | 151.1 |
| Ex. 15 | sodium chloride 0.4 wt % | nitric acid 0.4 wt % | 168.68 |
| Ex. 16 | sodium chloride 0.4 wt % and n-hexane | citric acid 0.8 wt % | 103 |

Comparative Example 2 shows that the iron content of the liquid mixture not treated with the second reagent is above 700 ppm. Hence, comparative Example 2 shows the iron content of an untreated waste silicon slurry. Examples 10-15 show that the iron content of the liquid mixture decreases to below 180 ppm when the waste silicon slurry is treated with the second reagent. The aforesaid Examples show that the efficiency of the removal of iron by the second reagent decreases in the order of oxalic acid plus citric acid>citric acid>acetic acid>oxalic acid>sulfuric acid>nitric acid. Example 16 shows that the waste silicon slurry is treated with the organic (n-hexane) first reagent and then with the organic second reagent (citric acid).

Although the present invention is disclosed above by preferred embodiments, the present invention includes various embodiments and the other embodiments described above. The preferred embodiments are illustrative, rather than restrictive, of the present invention. All changes and modifications made to the preferred embodiments without departing from the spirit embodied in the present invention must be included in the appended claims.

What is claimed is:

1. A method of using a waste silicon slurry, comprising the steps of:
    step (A): obtaining a waste silicon slurry containing a cutting oil and a metal;
    step (B): treating the waste silicon slurry with a first reagent for reacting with the cutting oil, wherein the first reagent includes one, or any combinations, of compounds with a structural formula (I): M-X, wherein M is selected from an alkali metal and an alkaline earth metal, and X is selected from halogen, sulfate and nitrate;
    step (C): treating the waste silicon slurry with a second reagent for reacting with the metal, wherein the second reagent includes oxalic acid and citric acid;
    step (D): separating products resulting from step (B) and step (C) to obtain a solid portion; and
    step (E): treating the solid portion with a third reagent to obtain silicates and hydrogen gas, wherein the third reagent produces an alkaline substance producing hydroxyl ions in water.

2. The method of using a waste silicon slurry according to claim 1, wherein said compound of structural formula (I) is selected from sodium chloride, potassium chloride, calcium chloride, sodium sulfate, sodium nitrate, ethanol, n-hexane, and a combination thereof.

3. The method of using a waste silicon slurry according to claim 1, wherein the third reagent is a caustic base of alkali metal or alkaline earth metal.

4. A method of using a waste silicon slurry, comprising the steps of:
    step (A): obtaining a waste silicon slurry containing a cutting oil and a metal;
    step (B): treating the waste silicon slurry with a first reagent for reacting with the cutting oil, wherein the first reagent includes one, or any combinations, of compounds which conform with structural formula (I), with structural formula (I): M-X, wherein M is selected from an alkali metal and an alkaline earth metal, and X is selected from halogen, sulfate, and nitrate;
    step (C): treating the waste silicon slurry with a second reagent for reacting with the metal, wherein the second reagent is citric acid;
    step (D): separating products resulting from step (B) and step (C) to obtain a solid portion; and
    step (E): treating the solid portion with a third reagent to obtain silicates and hydrogen gas, wherein the third reagent produces an alkaline substance producing hydroxyl ions in water.

5. The method of using a waste silicon slurry according to claim 4, wherein said compound of structural formula (I) is selected from sodium chloride, potassium chloride, calcium chloride, sodium sulfate, sodium nitrate, and a combination thereof.

6. The method of using a waste silicon slurry according to claim 5, wherein the third reagent is a caustic base of alkali metal or alkaline earth metal.

* * * * *